United States Patent [19]

Wuller et al.

[11] Patent Number: 5,721,691
[45] Date of Patent: Feb. 24, 1998

[54] RECONNAISSANCE AND CHARACTERIZATION SYSTEM FOR LIMITED- OR DENIED-ACCESS BUILDING AND FACILITIES

[75] Inventors: Charles E. Wuller, Manhattan Beach; George H. Gelb, Rancho Palos Verdes, both of Calif.

[73] Assignee: TRW Inc., Redondo Beach, Calif.

[21] Appl. No.: 315,513

[22] Filed: Sep. 30, 1994

[51] Int. Cl.$^6$ .................................................. G06F 15/00
[52] U.S. Cl. ............... 364/512; 364/424.33; 364/468.4; 395/125; 395/127; 395/129
[58] Field of Search ........................... 364/512, 578, 364/468, 188, 400, 401, 402, 464.01, 474.24, 468.03, 468.04, 468.12, 468.13, 468.14, 468.25, 468.26, 470.01, 470.02, 474.22, 423.098, 423.099, 424.033; 395/140, 141, 919, 920, 921, 120, 155, 156, 118–119, 125–127, 121, 129–132, 152, 163, 122, 151, 500, 501; 128/665, 634

[56] References Cited

U.S. PATENT DOCUMENTS

| | | | |
|---|---|---|---|
| 4,574,395 | 3/1986 | Kato | 395/118 |
| 4,600,200 | 7/1986 | Oka et al. | 395/121 |
| 4,885,694 | 12/1989 | Pray et al. | 364/464.1 |
| 4,888,713 | 12/1989 | Falk | 395/119 |
| 4,951,040 | 8/1990 | McNeil et al. | 345/139 |
| 4,959,798 | 9/1990 | Gordon et al. | 364/424.2 |
| 4,965,753 | 10/1990 | Kraemer | 395/121 |
| 5,041,961 | 8/1991 | Inaki | 364/191 |
| 5,061,997 | 10/1991 | Rea et al. | 364/550 |
| 5,280,305 | 1/1994 | Monroe et al. | 347/129 |
| 5,414,801 | 5/1995 | Smith et al. | 395/119 |
| 5,517,603 | 5/1996 | Kelley et al. | 395/126 |

*Primary Examiner*—Kevin J. Teska
*Assistant Examiner*—Jacques Louis-Jacques
*Attorney, Agent, or Firm*—Robert W. Keller; Noel F. Heal

[57] ABSTRACT

Apparatus, and a related method, for photographing the interior of a building to which access by personnel has been limited or denied because of contamination of some kind, and then converting the resulting photographic images to a three-dimensional digital model, which may be used to generate different types of information for safe and efficient decontamination or deconstruction of the building. In the embodiment of the invention disclosed herein by way of example, the photographs are taken by personnel in protective clothing or by a remotely controlled mobile robot. Then the photographic images are digitized and processed to create a three-dimensional model stored in a database. The model database is updated to include information not in the original photographs, and then used to create additional interior views, animated videos of the interior, real-time computer displays, or drawings in a conventional computer aided design (CAD) format. The drawings are used to facilitate a contaminant survey of the building interior, using personnel or the mobile robot to carry contaminant detectors. The contaminant data are overlayed on the drawings to provide a contaminant dose map of the interior.

20 Claims, 3 Drawing Sheets

RECONNAISSANCE AND CHARACTERIZATION SYSTEM FOR LIMITED- OR DENIED-ACCESS BUILDING AND FACILITIES

BACKGROUND OF THE INVENTION

This invention relates generally to systems for generating information concerning the interiors of buildings and facilities to which access by personnel is limited or denied. The invention is particularly useful in safe shutdown, decontaminating, deconstructing, maintaining, renovating or modifying buildings and facilities to which access is limited or denied due to the presence of radioactive, toxic or hazardous materials. Access may also be limited because of dangerous structural conditions, or otherwise potentially harmful environmental conditions within a building or facility.

Many examples of such buildings and facilities may be found in nuclear processing plants of various types, which may have been shut down after years of use, but which still contain radioactive materials and objects. Even when a radioactive facility has been designated for safe shutdown, decontamination or deconstruction, a common difficulty is that there are no accurate plans of the building and, even if building plans are available, no information is available about equipment and objects stored in the building, i.e. accurate data as to configurations and status needed to ensure safety, minimize cost, and so forth. Some buildings and facilities of this type are so radioactive that access by personnel is completely denied. Others may permit limited access to personnel in protective clothing, but these impede the efficiency of data collection necessary to perform all the functions of safe shutdown, decontamination or deconstruction. Destruction of the building without decontamination measures is not usually an option, since this would result in uncontrolled spreading of contaminants in the vicinity of the building. Ideally, a technique is needed for generating detailed three-dimensional information about equipment, objects and structures in a building to which access has been limited or denied.

Photogrammetry and computer graphics technologies have been developed for generating three-dimensional computer models from two-dimensional photographs. Moreover, computer aided design (CAD) systems facilitate the production of two-dimensional drawings from computer models of various objects. However, none of these technologies provides a ready-solution to the problem discussed above. In brief, there is still a need for a technique that generates relatively complete information concerning the configuration and status of the interiors of buildings and facilities, as well as objects they contain, when access is limited or denied. Such information greatly facilitates decontamination or deconstruction of the building or facility. The present invention satisfies this need.

SUMMARY OF THE INVENTION

The present invention resides in a method and related apparatus for generating an accurate three-dimensional model and associated attributes database of the interior of a building or facility to which access by personnel has been limited or denied. Briefly, and in general terms, the method of the invention comprises the steps of directing either personnel or a robot to enter the building and take multiple photographs of the interior; processing the photographs photogrammetrically to obtain a consistent set of data defining the position, shape, color, and texture of structures, equipment, and/or other objects in the interior of the building; converting the data obtained from the photographs to a three-dimensional digital model; storing the digital model in a computer database; updating the database with additional information about the equipment, objects and structures in the building, obtained from external sources or from personal knowledge of an operator; and using the database to obtain additional information about the interior of the building.

The database is a graphical information system in which data pertaining to the dimensions, identity, contamination, and so forth are stored and from which the data are retrieved as attributes of the objects in the digital model. The model stored in the database may be put to a variety of uses, such as generating additional views requested by a user. These views may be rendered as still pictures of the building interior as seen from vantage points different from those from which the original photographs were taken, or may comprise a recorded video or a real-time computer display from the vantage point of a person moving through the building.

Another important use of the database is in the generation of display images in a conventional computer aided design (CAD) format, and deriving from the database a bill of materials relating to the equipment and objects in the building. The CAD-format images and the bill of materials can then be employed in formulating a plan for safe shutdown, decontamination, deconstruction, maintenance, renovation or modification of the building.

More specifically, the step of using the database may further include planning a contaminant survey of the building interior, making use of the display images in CAD format as a map of the building; performing the contaminant survey; and then updating the database to include data relating to mapped contamination levels in the building. Performing a contaminant survey may include the steps of mounting contaminant detectors on the robot, and directing the robot to enter the building again and record contaminant levels at selected locations, which are defined and determined in part from the CAD images of the building interior.

In terms of apparatus, the invention may comprise a mobile robot (which may be a robotic gantry crane or robotic manipulator arm), including means for directing the robot to enter the building and means for taking multiple photographs of the interior; and means for processing the photographs photogrammetrically to obtain a consistent set of data defining the position, shape, color and texture of structures, equipment and objects in the interior of the building. The apparatus further includes means for converting the data obtained from the photographs to a three-dimensional digital model; means for storing the digital model in a computer database; means for updating the database with additional information about the equipment and objects in the building, obtained from external sources or from personal knowledge of an operator; and means for using the database to obtain additional information about the interior of the building.

As in the method of the invention, the apparatus includes a number of variants of the means for using the database. Specifically, the means for using the database may take the form of means for generating additional views requested by a user, and the additional views may be additional still views of the building interior as seen from different vantage points, or either a recorded video or a real-time computer display from the vantage point of a person moving through the building.

The means for using the database may also include means for generating display images in a CAD format, and means for deriving from the database a bill of materials relating to the equipment and objects in the building.

The means for using the database may further include means for planning a contaminant survey of the building interior, making use of the display images in CAD format as a map of the building; means for performing the contaminant survey; and means for updating the database to include data relating to mapped contamination levels in the building. More specifically, the means for performing a contaminant survey includes means for mounting contaminant detectors on the robot; and means for directing the robot to enter the building again and record contaminant levels at selected locations, which are determined in part from the CAD images of the building interior.

It will be appreciated from the foregoing that the present invention represents a significant advance in techniques for surveying buildings to which access has been limited or denied, and planning for subsequent safe shutdown, decontamination, deconstruction, maintenance, renovation or modification of the buildings. Other aspects and advantages of the invention will become apparent from the following more detailed description, taken in conjunction with the accompanying drawings.

DESCRIPTION OF THE PREFERRED EMBODIMENT

Figure 1:
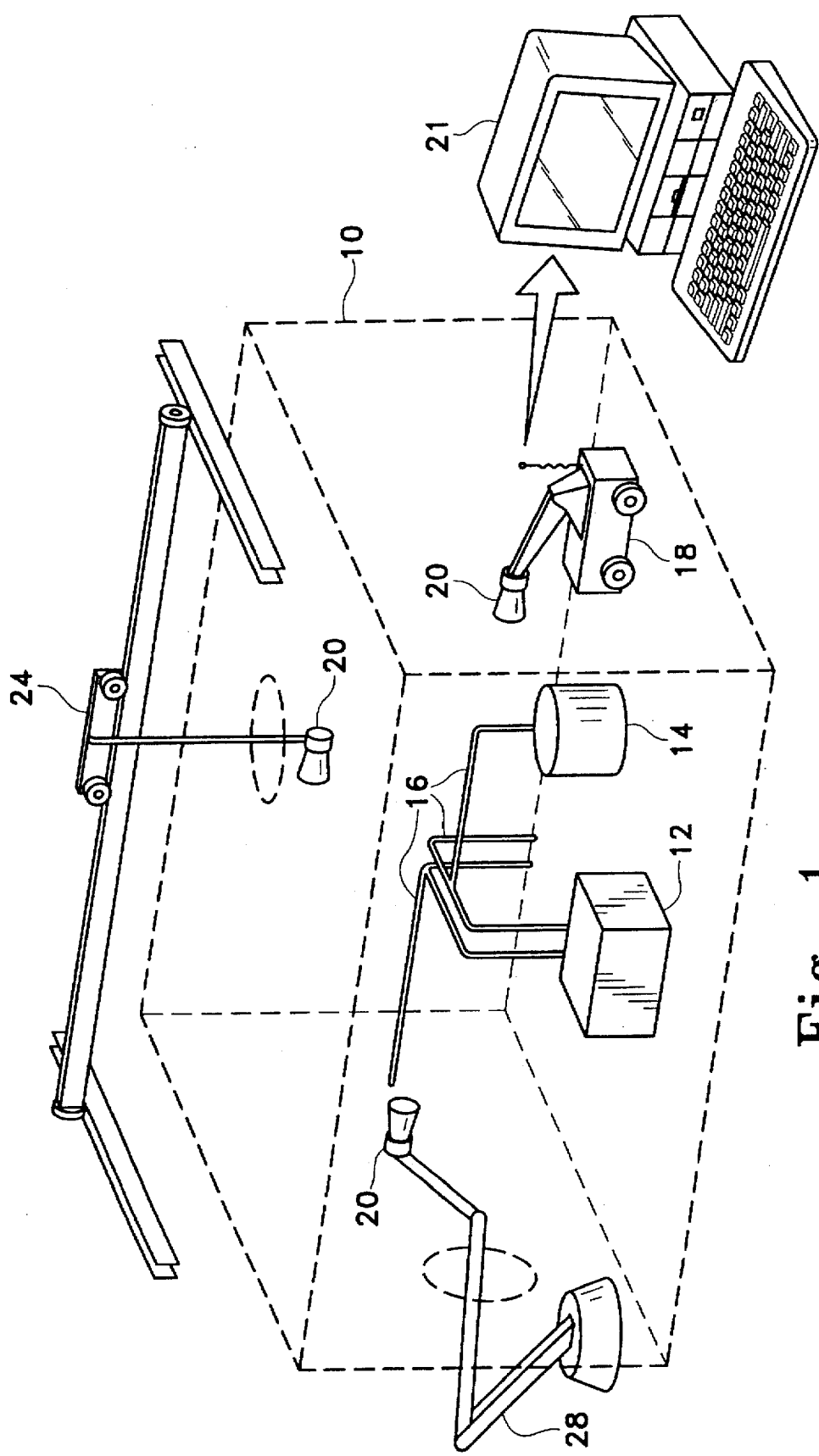
FIG. 1 is a diagrammatic view showing a building to which access by personnel has been denied or limited, and three alternative robotic devices used for gathering data from the building.

As shown in the drawings for purposes of illustration, the present invention is concerned with a system for reconnaissance and characterization of buildings to which access has been limited or denied. For example, buildings contaminated with radioactive materials present a special problem for decontamination and deconstruction, since the identity and location of equipment and other objects in the building are often completely unknown. Even when limited access is available, multiple visits in protective clothing may be needed to completely characterize the building and formulate a plan for its decontamination or deconstruction.

In accordance with the invention, either personnel in protective clothing or a remotely controlled robot is used to obtain two-dimensional photographs of the interior of the building or facility; then the photographs are used to create a three-dimensional computer model of the interior. Once the model is complete, other views of the interior may be generated for a user of the system, or planning for a contaminant survey may be initiated, or deconstruction estimates may be made, all without further human need for entering the building.

FIG. 1 shows by way of example a one-room building, indicated by reference numeral 10, in which there is shown a box-like enclosure 12, a cylindrical tank 14, and interconnecting pipes 16. Initially, a mobile robot 18 enters the building 10 and takes a number of still photographs, using a camera 20, of as many locations as possible within the building, all under the control of a controller 21, such as the computer illustrated. Upon emerging from the building, the robot 18 is appropriately decontaminated and film is recovered from the camera 20. The images are converted to a digital format for further processing, or the camera 20 may record images digitally on a medium installed in the camera or located outside the building. In any event, the result of the reconnaissance by the robot 18 is a set of digital photographic images, in color, of the interior of the building 10. Alternatively, the camera 20 can be positioned by attachment to a robotic gantry crane 24 or a robotic manipulator arm 28 operating through an opening in the building 10.

The robot 18 is a remotely operated vehicle such as the Andros Mark VI model made by REMOTEC, of Oak Ridge, Tenn., further details of which are provided below. The camera 20 is preferably a high-quality photogrammetry camera, such as the Rolleiflex 3003 Metric (available from Schneider Corp. of America, Woodbury, N.Y.). Conventional photogrammetric software (such as RolleiMetric MR2 Plus software) is used for initial processing of the photographic images to provide a geometrically and spatially correct data set representative of objects within the fields of view of the camera.

Figure 2:
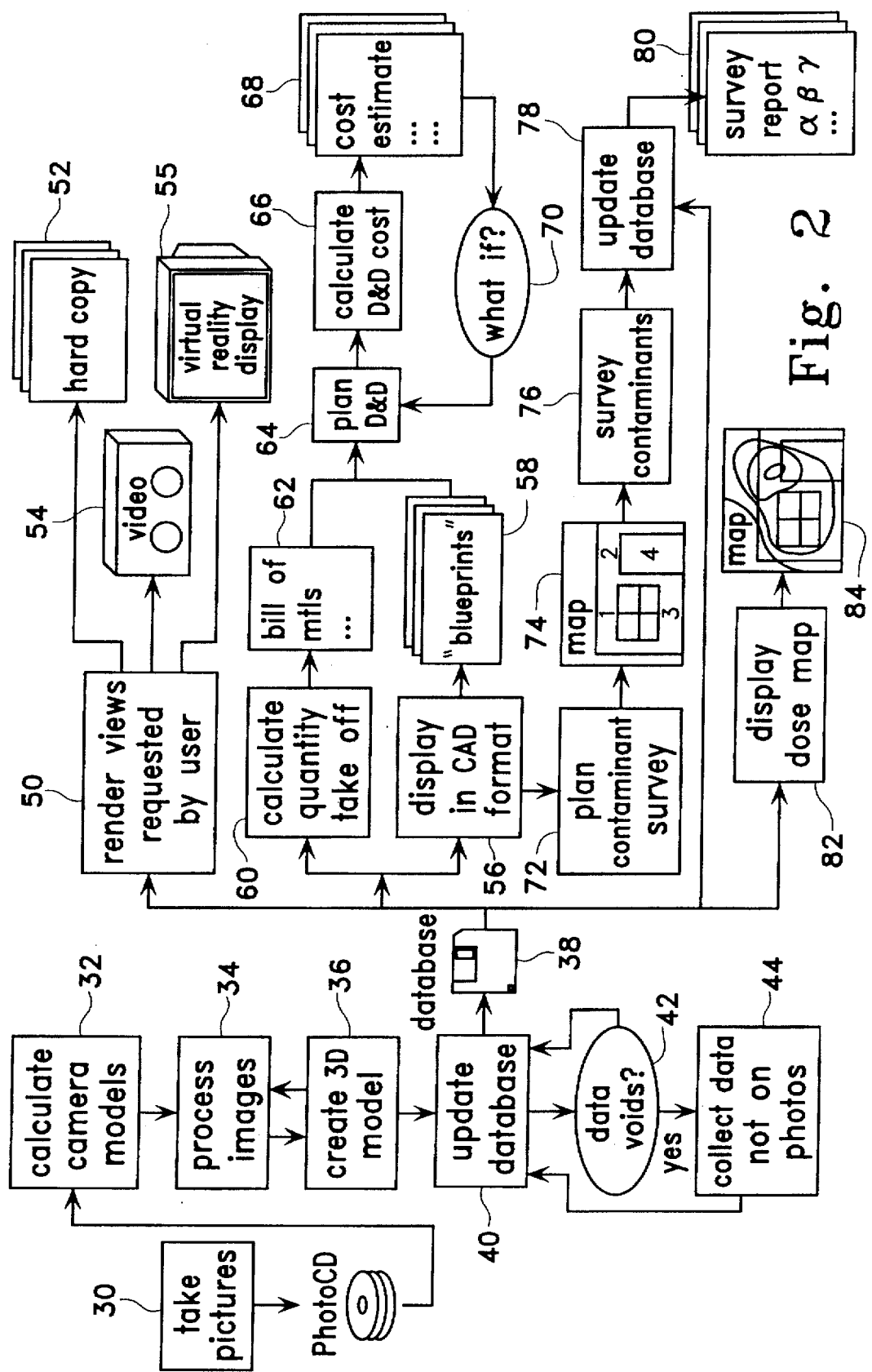
FIG. 2 is a block diagram showing the functional components of the invention.

FIG. 2 shows the steps performed in accordance with the invention. After taking the photographs (indicated by block 30), camera positions are calculated, using the conventional photogrammetry software referred to above, as indicated in block 32. The position of the camera 20 for each photograph is calculated based on knowledge of a scale or object of known dimensions in the photograph. The next step is to process the photographic images digitally to correct contrast or exposure of the photographs, as indicated in block 34. This step is needed to ensure that the data from all the photographic images are consistent and may be properly combined into a set of image data.

The next step in processing is the creation of three-dimensional models of the interior objects and features, from the two-dimensional photogrammetry data, as indicated in block 36. The software used in blocks 34 and 36 is ESL Incorporated's Imagery Perspective Transformation (IPT) system. The IPT software was designed for use in converting aerial photogrammetrical images to three-dimensional cityscapes, but the same principles may be applied to converting interior photographs to a three-dimensional model. An important aspect of the conversion process and generation of the three-dimensional model is that colors and textures of surfaces are preserved as far as possible in the model.

The process of creating the model involves considerable interaction between the software and an operator at a computer terminal, to identify equipment and other objects in the building. As various aspects of the model are completed, they are added to a model database 38 as indicated in block 40. The database 38 is further updated when the operator detects voids in the data (block 42) and then collects data from other sources (block 44). In the presently preferred embodiment of the invention, relational database management system software known as Oracle, published by Oracle Corp., Redwood Shores, Calif., is used to process, store and manage these data and to update the database 38. Some of these external data items may come from the operator's personal knowledge, when he recognizes an object from the visual clues of the colors and textures in the photographs and supplies additional information, or from available plans and manuals for the building and its contents.

Once the database 38 has been refined to an acceptable level of detail, it may be put to various uses. What constitutes an acceptable level of detail in the database depends on the application of the data. An important function of the invention is to produce additional images of the interior of the building 10, from the database 38, as indicated in block 50. The additional images may be computer rendered "photo realistic" images (as indicated at 52) produced on a suitable color printer and showing views from different vantage points in the building, or animated video images of a simulated "walk-through" of the building (as indicated at 54), or a real-time simulated walk-through using "virtual reality" software and hardware (as indicated at 55), such as the World Tool Kit software published by Sense8 of Sausalito, Calif., and the Onyx Reality Engine computer manufactured by Silicon Graphics, Inc. of Mountain View, Calif. The walk-throughs, which are output to either an appropriate video recorder or a computer display, may be used to train personnel who will ultimately enter the building, or who will operate robots that enter the building to perform decontamination or deconstruction tasks. The IPT software package includes modules that perform the functions indicated at 52 and 54.

The database 38 may also be used by commercially available computer aided design (CAD) software, such as AutoCAD, published by Autodesk, Inc of Sausalito, Calif., to produce a display of the room and its contents in a standard CAD format, as indicated in block 56. The standard CAD format allows the generation of drawings of objects in the room, as indicated at 58. A related application of the database 38 is to calculate a quantity take-off list, as indicated at 60, to generate a report 62 analogous to a bill of materials. The bill of materials 62 and the drawings 58 may then be used to plan decontamination and deconstruction of the building (block 64) and to calculate decontamination and deconstruction costs (block 66). Software is available to calculate these cost estimates, such as Precision Extended software (from Timberline Software Corporation, Beaverton, Ore.). The cost estimates 68 can then be used to feed back selected changes to the planning phase 64, as indicated at 70.

Of course, decontamination or deconstruction planning may require a detailed contaminant survey of the building 10. This is another application of the database 38. Data in CAD form, as derived in block 56, is used to plan the survey, as indicated in block 72 and to generate a map 74 of selected survey points in the building. AutoCAD provides this function. The map information is then used either to guide personnel or to control the robot 18, which again enters the building 10 to conduct the contaminant survey, as indicated at 76. The contaminant survey may use radiation sensors or sensors of other types (not shown) to detect toxic substance levels or other dangerous conditions. The survey data are then used to update the database, as indicated at 78, and to produce a survey report 80. Updating of the database is a function of the Oracle database software. When the database 38 has been updated with the survey data, the database may also be used to generate a contamination dose map of the building, as indicated at 82 and 84, using AutoCAD and QuickSurf software (from Schreiber Instruments of Denver, Colo.).

The combination of the IPT software that performs the functions of elements 34, 36, 40 and 50 with database 38 and virtual reality module 55 using Oracle and World Tool Kit, respectively, has been named CAPS (Characterization Analysis Planning Systems).

Figure 3:
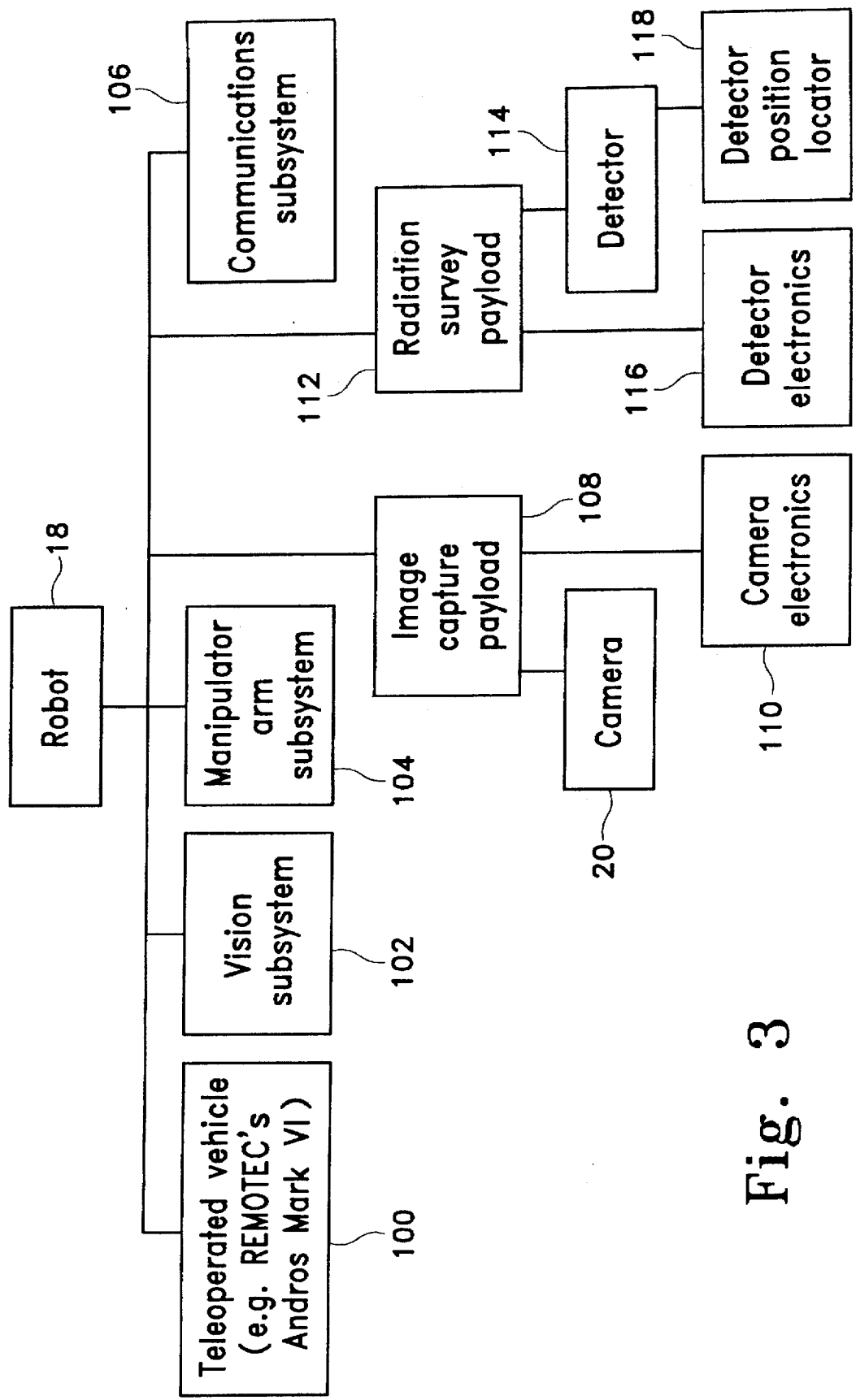
FIG. 3 is a block diagram showing the component subsystems of a mobile robot for use in one embodiment of the invention.

FIG. 3 shows the principal subsystems of the robot 18. These include a teleoperated vehicle 100, such as REMOTECs Andros Mark VI, a vision subsystem 102, a manipulator arm subsystem 104 and a communications subsystem 106. The vision subsystem 102 provides limited collision avoidance capability and the communications subsystem 106 provides for the transmission of vision data, manipulator data and payload data to and from the robot. A payload is mounted on the end of a manipulator arm, which can be operated by the manipulator arm subsystem 104 to turn the payload to a desired orientation and to lift it to a limited extent. The payload during the initial photographic mission of the robot 18 is an image capture payload 108, which includes the camera 20 and camera electronics 110. During a contaminant survey, the payload may take the form of a radiation survey payload 112, including a detector 114, detector electronics 116 and a detector position locator 118. The position locator 118 may simply employ information from the robot vehicle as to its position and path, and the position of the manipulator arm. For greater accuracy, the detector position locator may include an instrument using sonic or laser range finding. The detector 114 may include an assortment instruments, such as Geiger-Mueller detectors, scintillation detectors, pressured ion chambers, and thermoluminescent dosimeters.

It will be appreciated from the foregoing that the present invention represents a significant advance in techniques for reconnaissance and characterization of buildings to which access is limited or denied. In particular, the invention provides a safe and convenient approach for determining the identity and position of equipment, objects and structures in the building, and subsequently performing a contaminant survey of the building. Data obtained from the building can then be used to generate drawings and equipment lists to facilitate decontamination and deconstruction, and to provide lifelike video presentations of the building interior for personnel training. It will also be appreciated that, although a specific embodiment of the invention has been described in detail for purposes of illustration, various modifications may be made without departing from the spirit and scope of the invention. Accordingly, the invention should not be limited except as by the appended claims.

We claim:

1. A method for reconnaissance and characterization of a building interior, which may include structures, equipment and other objects, and to which access by personnel has been limited, the method comprising the steps of:

taking multiple photographs of the interior of the building;

processing the photographs photogrammetrically to obtain a consistent set of data defining a position, a shape, a color, and a texture of each identifiable primitive geometric shape in the photographs, wherein the primitive geometric shapes are identifiable as structures, equipment, or other objects in the interior of the building;

converting the data obtained from the photographs to a three-dimensional digital model in which the position, the shape, the color and the texture, in three-dimensional space, of each of the structures, equipment or other objects are recorded to a desired degree of detail;

storing the digital model in a computer database; and using the database to obtain additional information about the interior of the building, wherein the step of using the database includes generating display images in a conventional computer aided design (CAD) format, planning a contaminant survey of the building interior, by making use of the display images in CAD format as a map of the building, performing a contaminant survey of the building interior, and updating the database to include data relating to mapped contamination levels in the building.

2. A method as defined in claim 1, and further comprising the step of:

updating the database with additional information about the structures, equipment, or other objects in the building, obtained from external sources or from personal knowledge of an operator.

3. A method as defined in claim 2, wherein the step of taking photographs is performed by personnel in protective clothing.

4. A method as defined in claim 2, wherein the step of taking photographs is performed by robotic means.

5. A method as defined in claim 2, wherein the step of using the database includes:

manipulating the database to generate additional views requested by a user.

6. A method as defined in claim 5, wherein the step of manipulating the database includes:

generating additional views of the building interior as seen from vantage points other than those from which the original photographs were taken.

7. A method as defined in claim 5, wherein the step of generating additional views includes:

generating an animated video or a real-time computer display from the vantage point of a person moving through the building.

8. A method as defined in claim 1, wherein the step of using the database includes:

generating display images in a conventional computer aided design (CAD) format.

9. A method as defined in claim 8, wherein the step of using the database further includes:

deriving from the database a bill of materials relating to the equipment and objects in the building.

10. A method as defined in claim 1, wherein the step of performing a contaminant survey includes:

mounting contaminant detectors on a robot; and directing the robot to enter the building and record contaminant levels at selected locations, determined in part from the CAD images of the building interior.

11. An apparatus for reconnaissance and characterization of a building interior to which access by personnel has been limited, the apparatus comprising:

means for taking multiple photographs of the interior of the building;

means for processing the photographs photogrammetrically to obtain a consistent set of data defining a position, a shape, a color, and a texture of each identifiable primitive geometric shape in the photographs, wherein the primitive geometric shapes are identifiable as equipment and objects in the interior of the building;

means for converting the data obtained from the photographs to a three-dimensional digital model in which the position, the shape, the color and the texture, in three-dimensional space, of each of the structures, equipment or other objects are recorded to a desired degree of detail;

means for storing the digital model in a computer database;

means for using the database to obtain additional information about the interior of the building; and means for updating the database with additional information about the equipment and objects in the building, obtained from external sources or from personal knowledge of an operator;

wherein the means for using the database includes means for generating display images in a conventional computer aided design (CAD) format, means for planning a contaminant survey of the building interior, by making use of the display images in CAD format as a map of the building, means for performing a contaminant survey of the building interior, and means for updating the database to include data relating to mapped contamination levels in the building.

12. Apparatus as defined in claim 11, and further comprising:

means for updating the database with additional information about the equipment and objects in the building, obtained from external sources or from personal knowledge of an operator.

13. Apparatus as defined in claim 12, wherein the means for taking multiple photographs includes:

camera equipment carried by personnel in protective clothing.

14. Apparatus as defined in claim 12, wherein the means for taking multiple photographs includes:

a mobile robot, including means for directing the robot to move within the building.

15. Apparatus as defined in claim 12, wherein the means for using the database includes:

means for generating additional views requested by a user.

16. Apparatus as defined in claim 12, wherein the means for generating additional views includes:

means for generating additional views of the building interior as seen from vantage points other than those from which the original photographs were taken.

17. Apparatus as defined in claim 16, wherein the means for generating additional views includes:

means for generating an animated video or a real-time computer display from the vantage point of a person moving through the building.

18. Apparatus as defined in claim 12, wherein the means for using the database includes:

means for generating display images in a conventional computer aided design (CAD) format.

19. Apparatus as defined in claim 18, wherein the means for using the database further includes:

means for deriving from the database a bill of materials relating to the equipment and objects in the building.

20. Apparatus as defined in claim 11, wherein the means for performing a contaminant survey includes:

means for mounting contaminant detectors on the robot; and means for directing the robot to move within the building and record contaminant levels at selected locations, determined in part from the CAD images of the building interior.

* * * * *